United States Patent [19]

Birnbaum et al.

[11] 3,715,510

[45] Feb. 6, 1973

[54] METHOD AND APPARATUS FOR HANDLING DATA FROM A PLURALITY OF CHANNELS

[75] Inventors: Burton H. Birnbaum, Floral Park; Daniel J. Spier, Little Neck, both of N.Y.

[73] Assignee: Computer Instruments Corporation, Hempstead, N.Y.

[22] Filed: Sept. 25, 1970

[21] Appl. No.: 75,607

[52] U.S. Cl. ............................179/15 BM, 179/15 A

[51] Int. Cl. ................................................H04j 3/16

[58] Field of Search ....329/1, 50; 307/233, 234, 261; 179/15 BM, 15 A; 325/320; 178/66 R

[56] References Cited

UNITED STATES PATENTS

| | | | |
|---|---|---|---|
| 3,535,658 | 10/1970 | Webb | 307/233 |
| 3,471,646 | 10/1969 | Magnuski | 179/15 BM |
| 3,456,607 | 12/1970 | Dixon | 307/233 |
| 3,495,096 | 2/1970 | Blachowicz | 307/233 |

*Primary Examiner*—Kathleen H. Claffy
*Assistant Examiner*—David L. Stewart
*Attorney*—Robert R. Strack and James A. Eisenman

[57] ABSTRACT

A time-multiplexing system wherein a frequency-modulated signal contains the data from a plurality of channels in time-sequential order. Each channel is represented by the same integral number of periods of a sample of the signal therein. Upon reception of this signal, it is converted back to individual channels of data by controlled integration of a constant signal in accordance with the duration of the period of the signals in each sample.

6 Claims, 4 Drawing Figures

INVENTORS
DANIEL J. SPIER
BURTON H. BIRNBAUM
BY
Eisenman and Strack
ATTORNEYS

INVENTORS
DANIEL J. SPIER
BURTON H. BIRNBAUM
BY
Eisenman and Strack
ATTORNEYS

INVENTORS
DANIEL J. SPIER
BURTON H. BIRNBAUM
BY
Eisenman and Strack
ATTORNEYS

METHOD AND APPARATUS FOR HANDLING DATA FROM A PLURALITY OF CHANNELS

BACKGROUND OF THE INVENTION

1. Field of the Invention

This invention relates to the transmission and reception of data; more particularly, it relates to a method and apparatus for transmitting and receiving analog data from a plurality of discrete channels, over a single channel.

2. Description of the Prior Art

Large quantities of data must often be transmitted over limited channel space in connection with such varied communication networks as those presented by overland telephone lines and inter-space transmissions. In transmitting data, one is concerned with the limitations imposed by the bandwidth and signal-to-noise ratio of the channel. One is also concerned with the number of discrete channels available. It is well known that the multiplexing of data from a plurality of discrete inputs may make possible the maximum utilization of time and frequency. A large number of multiplexing techniques have been developed. Among these techniques are arrangements for multi-channel transmission using a plurality of separate carrier frequencies within the bandwidth of the equipment, each frequency handling one channel. Among other problems, difficulties with these particular multiplexing systems arise due to cross-talk and harmonic interference.

Another multiplexing technique relates to timesharing wherein individual input channels of data are transmitted within specified increments of time by means of sampling the inputs and the availability of various output channels or lines as time progresses. Here, too, difficulties are presented by the chopping of data and the degradation of data fidelity.

SUMMARY OF THE INVENTION

The present invention presents a system of data transmission wherein the data from each input channel is transmitted sequentially during periods determined by the periodicity of the data itself. The present system may be expanded by operation on a plurality of carrier frequencies each disposed within the bandwidth of the transmitting channel.

It is an object of the present invention to provide an improved data transmission and receiving system.

It is another object of the invention to provide an improved method and apparatus for the transmission and reception of data occuring substantially coincidentally in a plurality of input channels.

It is another object of the present invention to provide an improved multi-channel data transmission and reception system wherein the data from each input channel is transmitted on a time-sharing basis with all other input channels being transmitted.

It is another object of the present invention to provide an improved multi-channel data transmission system having a better signal-to-noise ratio then heretofore available.

It is yet another object of the present invention to provide an improved data transmission and reception system having a greater bandwidth than has heretofore been available.

In accordance with one aspect of the present invention, there is provided a method of transmitting and receiving analog data from a plurality of channels, comprising transmitting a frequency-modulated signal sequentially comprising an integral multiple of periods of signals representative of the data in each of said channels, converting this frequency-modulated signal to a commensurate pulse-width modulated signal, sampling the pulse-width modulated signal at intervals determined by the periods thereof, and subsequently converting the width of each sampled pulse-width modulated component to a discrete analog signal commensurate therewith.

In accordance with another aspect of the invention, there is provided a receiver of frequency modulated signals whose frequency is commensurate with the amplitude of an analog signal. This receiver comprises means for integrating a DC signal for each period of the same frequency modulated signal, and means for sampling the level of the integrating means following termination of each of the periods.

A more complete understanding and appreciation of the objects and features of the present invention will be available from the following description of several preferred embodiments which are illustrated in the drawings.

DESCRIPTION OF PREFERRED EMBODIMENTS OF THE INVENTION

It is well known that one may convert an analog signal to a corresponding frequency modulated signal. A common means for accomplishing this is a voltage controlled oscillator wherein a Direct Current (DC) input to the oscillator creates an output signal having a frequency indicative of the magnitude of the input. In the unique system described hereinafter, all analog data is first converted to a frequency modulated counterpart. Thus, the input signals dealt with in the following discussion are all frequency modulated signals representing analog input data.

Figure 1:
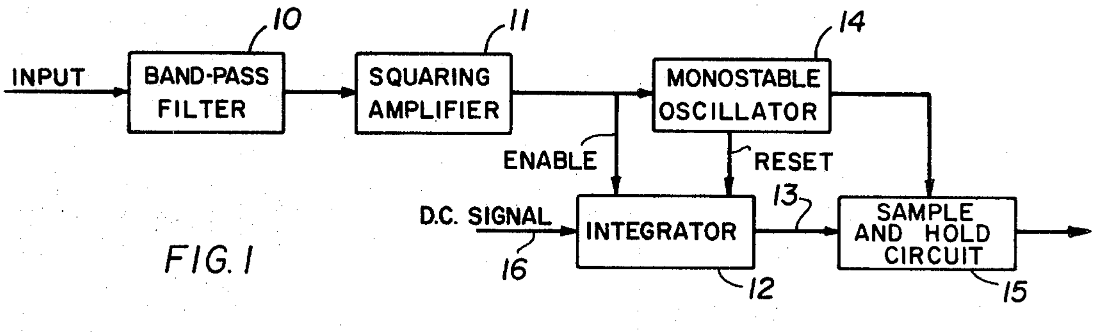
FIG. 1 is a block diagram of a one-channel receiver embodying features of the present invention.

With reference to FIG. 1, the frequency modulated input signal is applied to a receiver that has been adapted to operate upon a single channel only. The Input is supplied to a Bandpass Filter 10 which serves merely to eliminate any spurious components that may have been introduced during transmission. The output of the Bandpass Filter is then operated upon by a Squaring Amplifier 11 which produces a rectangular waveform, wherein the period of each pulse represents the corresponding period of the frequency modulated signal. Each output pulse from Squaring Amplifier 11 consists of a positive going portion and negative going portion. While the output of the Squaring Amplifier is positive, it operates to enable an Integrator 12. A further input to Integrator 12 is a constant DC signal 16. In the manner well known to those skilled in the art, Integrator 12 is operated to integrate the DC signal during the period of its enablement. IN effect, the Integrator converts time to voltage. It is initially set and charges for a time proportional to the period of the frequency modulated signal, as represented by the output of Squaring Amplifier 11. When the output of Squaring Amplifier 11 goes negative, the Integrator ceases its operation and Monostable Oscillator 14 is triggered. The output of the Integrator on lead 13 is thus an analog voltage that is commensurate in magnitude with the input voltage that originally created the frequency-modulated signal.

Monostable Oscillator 14 is connected to the Integrator 12 and to a Sample and Hold Circuit 15 in order to gate the existing level of voltage in the Integrator into the Sample and Hold Circuit. After Sample and Hold Circuit 15 has registered the value of the integration, Integrator 12 is reset and prepared to operate on the succeeding cycle of the input signal. It will be seen that this receiving system operates repetitively with each cycle of the frequency-modulated input signal and that the sample rate is equal to the frequency thereof.

Figure 2:
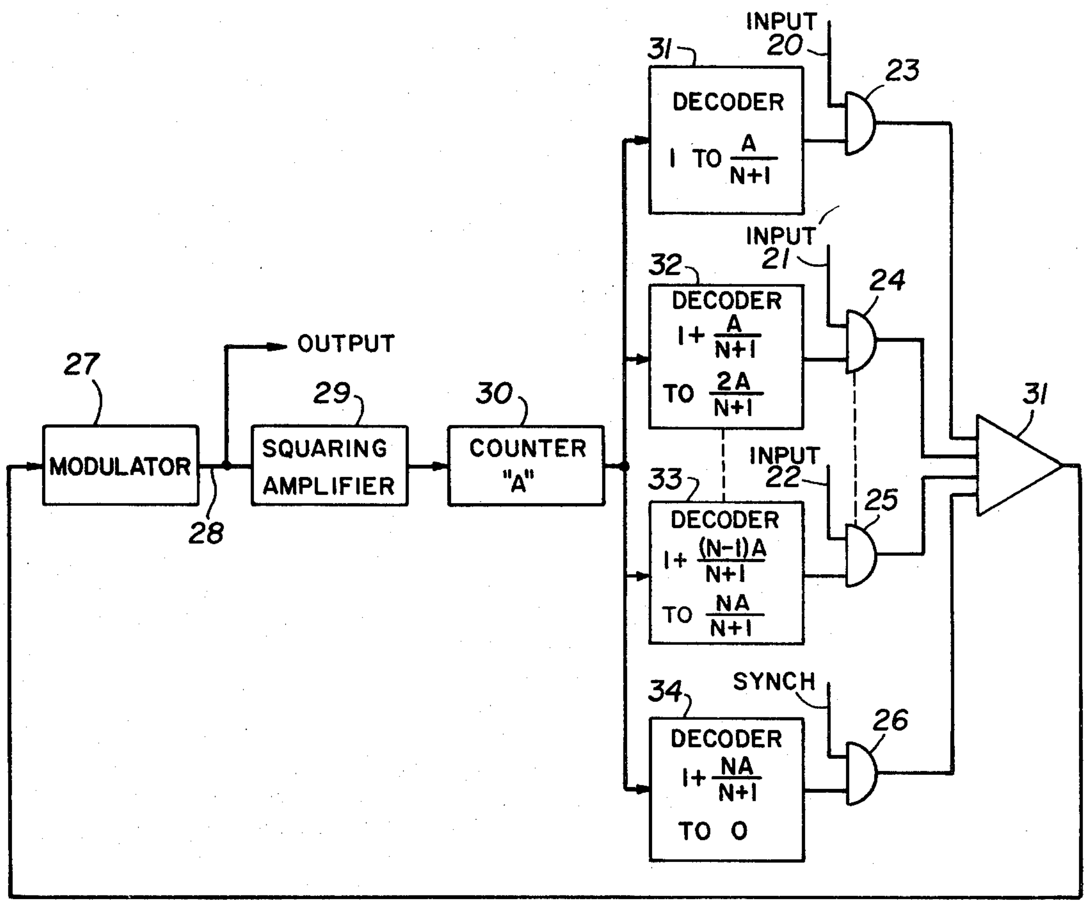
FIG. 2 is a block diagram of an N channel transmitter embodying features of the present invention.
Figure 3:
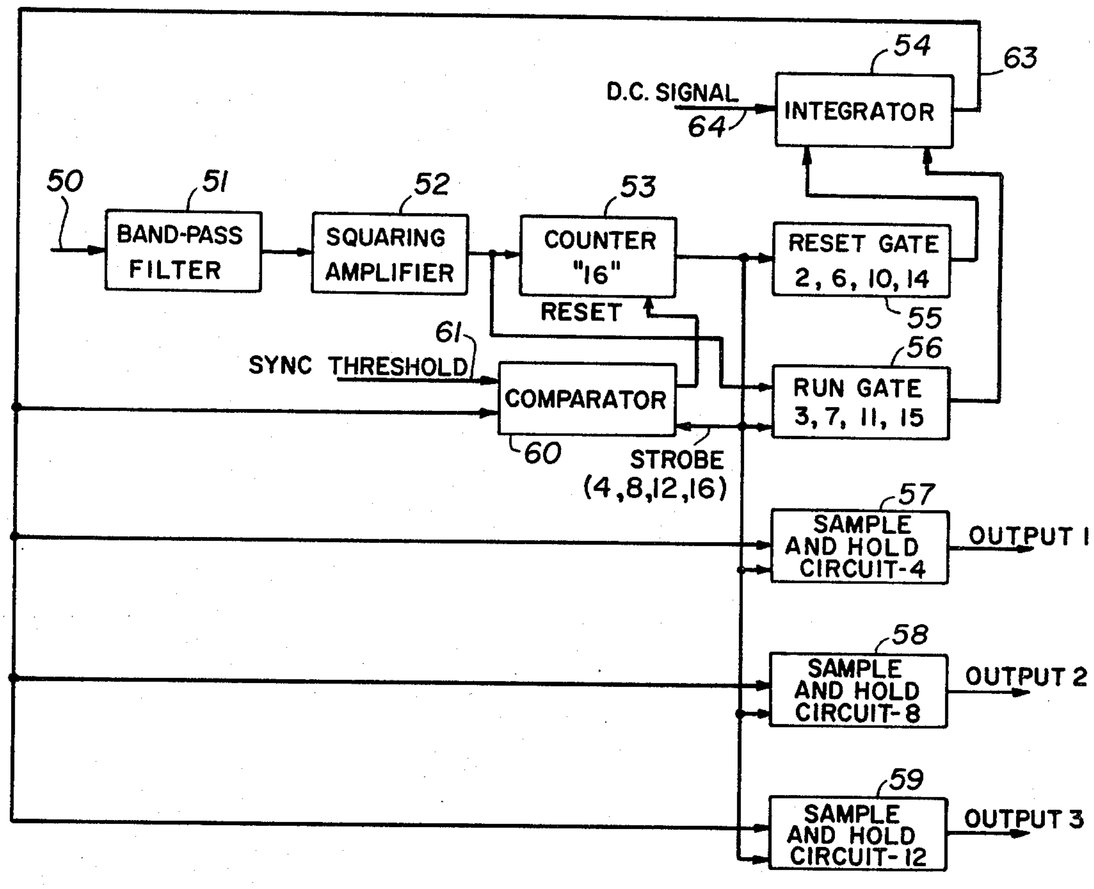
FIG. 3 is a block diagram of a three-channel receiver embodying features of the present invention.

The basic signal handling technique suggested by the single channel receiver discussed and illustrated in FIG. 1, may be employed to produce a transmitting and receiving system capable of handling a plurality of channels. FIGS. 2 and 3 illustrate a suitable transmitter and receiver, respectively, for the handling of an N channel system.

FIG. 2 shows the arrangement for an N channel transmitting system wherein analog input data is presented on inputs 20, 21, and 22, gated through Gates 23, 24, and 25, and applied through a Summing Amplifier 31 to a Frequency Modulator 27. An output is extracted on lead 28 which is suitable for transmission. Due to the selective enablement of the various Gates, this output signal comprises a sequentially arranged sampling of each input.

In accordance with the invention, the sampling is uniquely performed at a rate determined by the input signals. This is effected by converting the modulated signal output on lead 28 into a square wave, counting the number of pulses in this square wave, and selectively gating the inputs in accordance with the registration of preselected numbers as they occur in a normal counting cycle.

In FIG. 2, a Squaring Amplifier 29 is supplied by Modulator 27. This Amplifier produces rectangular pulses having a periodicity equivalent to that of the modulated signal from Modulator 27. These pulses are applied as trigger pulses to a Counter 30. The Counter may be of conventional form and has been generally indicated to register a full count when the digit A is attained. Outputs are taken selectively from the various stages of Counter 30 via Decoders 31, 32, 33, and 34. The purpose of the Decoders is to develop an enabling signal for application to the various channel selecting Gates 23–26. The particular enabling signals are produced in accordance with particular groups of integers in the series produced by Counter 30. Thus, the first group of integers, where N equals the number of channels being processed, would fall within the range of 1 to A/(N+1); the second group of integers would fall within the range of 1 + A/N+1 to 2A/N+1. The general expression for the group of integers enabling the last data transmission channel is 1 + (N−1)A/N+1 to NA/N+1.

In order to more easily understand and appreciate the operations that are being performed, let $N = 3$ and $A = 16$. In this instance, Decoder 31 will produce an output signal for Enabling Gate 23 whenever Counter 30 registers a number from 1 to 4; Decoder 32 will produce an enabling signal for Gate 24 whenever the Counter registers a number from 5 to 8. Decoder 38 will produce an enabling signal for Gate 25 whenever Counter 30 registers a number from 9 to 12, and Decoder 34 will produce an enabling signal for Gate 26 whenever Counter 30 registers a number from 13 to 16. Decoder 34 and Gate 26 are part of a synchronizing channel which will be discussed hereinafter.

As a result of the interconnections shown in FIG. 2, a composite frequency-modulated signal is produced which represents input 20 for the first four cycles. The next succeeding four cycles represent input 21; the penultimate four cycles in any complete operating cycle represent input *N;* and the final four cycles represent a synchronizing signal selectively provided for its distinctive characteristics.

It will be understood that at time difficulty may be experienced in decoding or reassembling the original input data in its proper channel. This is a particular possibility where one channel is temporarily free of any data for transmission. In order to provide a synchronizing signal for receiving equipment, it is proposed to produce a known high amplitude synching input via Gate 26 in the last channel position of a complete operating cycle. This high amplitude signal will be greater than any data to be transmitted and is thus easily and conveniently recognizable at a receiver. It should be appreciated that the invention is not limited to a particular synchronizing arrangement nor to the utilization of a counter having a complete operating cycle of 16 counts. Such a counter is of convenience where one is interested in providing four cycles of data for handling in any channel. If one wishes to handle more than four cycles, a higher capacity counter may be employed. On the other hand, for handling less then four cycles, a lower capacity counter may be used.

Figure 4:
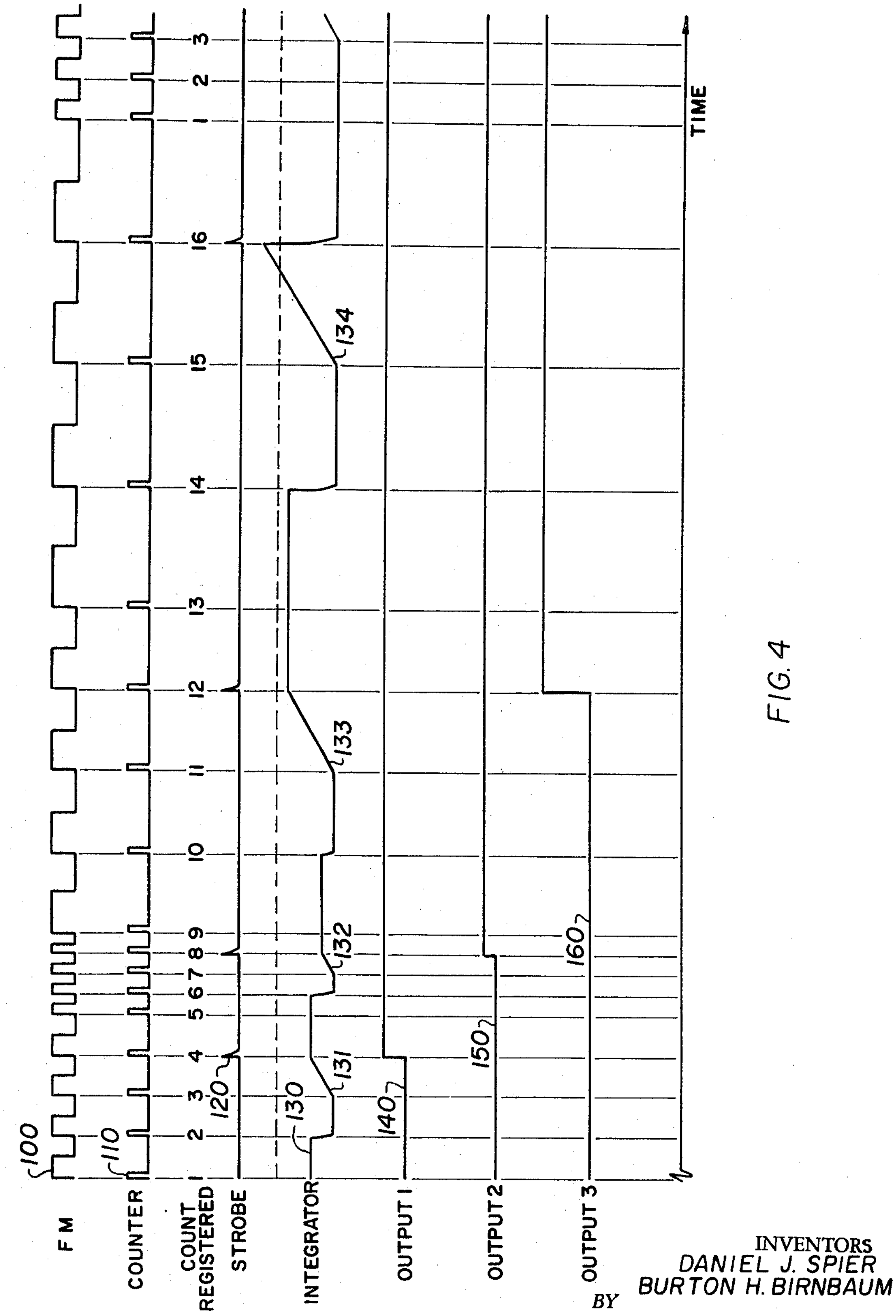
FIG. 4 consists of a plurality of waveforms plotted against time and useful in describing the operation of a receiver of the type illustrated in FIG. 3.

The handling of the composite sequentially arranged frequency-modulated multi-channel signal at a receiver, is explained in conjunction with the block diagram of the receiver in FIG. 3 and the waveforms presented in FIG. 4.

It will be noticed that the components of the receiver in FIG. 3 are basically similar to those previously discussed in connection with the single channel receiver shown in FIG. 1. Thus, a frequency modulated input signal on lead 50 is first applied to a Bandpass Filter 51 and then to a Squaring Amplifier 52. The first channel of information is applied through an Integrator Run Gate 56 to the Integrator 54 which produces an output representative of the analog equivalent of one period of the first channel data. This output is then presented to a Sample and Hold Circuit 57. The output of Sample and Hold Circuit 57 thus provides a DC voltage level output commensurate with the value of the original analog initiating signal. Each channel has a similar Sample and Hold circuit and the Integrator operates upon the appropriate channel under the control of an input Counter 53, Integrator Reset Gate 55, and Integrator Run Gate 56.

The operation of the receiver in FIG. 3 may be best appreciated by a consideration of the waveforms shown in FIG. 4, in which it is assumed that the receiver is running in synchronism with the transmitted signal. The top waveform 100 represents the output of the Squaring Amplifier 52. It will be noted that the first four cycles of this waveform have the same periodicity. These four cycles represent the frequency of the first data channel. The next four cycles, five to nine, have a different periodicity and represent the frequency of the signal in the second data channel. The same will be seen for the succeeding four cycles nine to 13, and the last four cycles 13 to 16. It is not essential that the period of each signal within a sample portion of a data channel be identical; however, for purposes of simplicity of explanation, it has been assumed that at least four cycles will be constant for any data to be transmitted. The first four cycles from Squaring Amplifier 52 are applied as triggering pulses to Counter 53 and result in the registration of a new digit with each triggering pulse. For purposes of illustration, the registration of each digit is illustrated as a short duration rectangular pulse in the waveform 100. Each fourth pulse is also used to produce a strobe signal that will be utilized in the manner discussed hereinafter. The various strobe signals are illustrated in waveform 120.

The output of each stage of Counter 53 is suitably connected to Reset Gate 55 such that Integrator 54 is reset to zero each time Counter 53 registers a 2, a 6, a 10, or a 14. The waveform 130 in FIG. 4 represents the Integrator output on lead 63 which will be seen to be reset at the registration of the aforementioned numbers.

The stages of Counter 53 are also connected suitably to the Integrator Run Gate 56 in order to initiate integration of the output from the Squaring Amplifier 52 whenever the Counter registers a 3, a 7, an 11, or a 15. Referring again to FIG. 4, it will be seen from waveform 130 that Integrator 54 commences integration at the number referred to above as shown at points 131, 132, 133, and 134, respectively. Considering the output of the Integrator at the fourth count of Counter 53, it will be seen to reside at a particular level. The voltage thus appears on lead 63. The appropriate stages of Counter 53 are also connected to the Sample and Hold Gates 57 through 59 in order to initiate storage of the output of Integrator 54 when the numbers 4, 8, and 12 are registered in Counter 53. Thus, when count 4 is registered, the signal appearing on lead 63 is stored in Sample and Hold Gate 57. Output 1 is immediately available therefrom as indicated in waveform 140 and this output is directly representative of the analog value of the data in channel 1.

When Counter 53 next registers a count of 6, the Reset Gate 53 is operative to reset the Integrator to zero. Upon registration of a count of 7, the Integrator Run Gate 56 is effective to enable the Integrator and register a value on output lead 63 commensurate in amplitude with the duration of the frequency modulated signal at that time. Subsequently, when a count of 8 is registered, Sample and Hold Gate 58 is enabled to store the value appearing on Integrator 54 and this becomes available at output 2 as a voltage level commensurate in amplitude with the duration of the frequency-modulated signal in data channel 2. This is indicated in waveform 150. A similar sequence of events takes place for the decoding and presentation of the data recorded in data channel 3, as illustrated by waveform 160.

When all three data channels have been decoded, it will be recalled that a synchronizing signal will appear in the transmitted group. Since we have assumed synchronized operation, the synchronizing signal begins at count 13 as shown in waveform 100 and is of longer duration than any data signal. During the group of registered numbers from 13 to 16, Reset Gate 55 and Integrator Run Gate 56 function as previously described. In this case, however, the integrated voltage produced on lead 63 at the output of Integrator 54 will be of greater value than heretofore experienced. Comparator 60 is provided for monitoring the output of Integrator 54 in order to detect when the synchronizing signal is received. One input to Comparator 60 is received over lead 61 and comprises a direct voltage level above that normally experienced in data reception. Another input is from Integrator 54, and a third input is from Counter 53.

A strobe signal is produced from the appropriate stages of Counter 53 each time the counter registers a count of 16 (zero), 4, 8, or 12. Thus, at the end of a complete operating cycle, when the Integrator has produced the excessively high voltage indicative of a synchronizing signal, the strobe at count 16 will enable Comparator 60 and the magnitude of the output voltage will be recognized. A reset signal is produced over lead 62 which is immediately applied to Counter 53 in order to initiate a new counting cycle. If all data channels always contained identifiable information, it would not be necessary to provide for a reset signal; however, where there is a possibility that the data channel may be empty during any sample period, it is necessary to insure proper spacing of the data sample so that confusion does not arise. With this circuit arrangement, even if the receiver begins operation at some point in time other than at the beginning of the first cycle of the first data channel, as soon as the synchronizing signal is received, the Counter will be reset and synchronization will be established.

In the foregoing disclosure, preferred embodiments of the invention have been described and illustrated. Every detail of the disclosure should not be taken as restrictive. For example, other synchronizing schemes may be employed. Furthermore, the principles and techniques embodied in the specific circuits shown, may be modified in accordance with particular desires and circuit requirements. All such modifications as come within the spirit and teaching of this invention, are intended to come within the scope of the following claims.

What is claimed is:

1. A method of transmitting and receiving analog data from a plurality of channels, comprising converting the analog data in each channel to a frequency-modulated signal wherein the frequency represents the amplitude of said analog data, sequentially transmitting a predetermined number of cycles of the frequency-modulated signal from each of said channels, detecting the period of at least one of said sampled cycles from each channel and producing discrete signals for each channel having an amplitude commensurate with the period of each of said detected cycles.

2. A method of transmitting and receiving analog data from a plurality of channels according to claim 1, wherein said detecting comprises conversion of each said sampled cycles of frequency-modulated signals to a substantially rectangular waveform, and integrating a known signal over a predetermined portion of said rectangular waveform.

3. A method of transmitting and receiving analog data from a plurality of channels according to claim 2, including counting said sampled cycles and selectively integrating said known signals, over a predetermined portion of a particular cycle of each sampled group under control of the numbers registered during said counting.

4. A method of transmitting and receiving a plurality of channels of analog data according to claim 1, including producing a discrete signal and transmitting it at the end of each complete sequence of sampled cycles.

5. Apparatus for producing a frequency-modulated signal representing signals from a plurality of channels, comprising counting means responsive to triggering pulses to successively register digits in ascending order, a gate for each of said channels having the signal from the associated channel supplied as an input thereto, a decoder for each of said channels and operative in accordance with the digits registered in said counting means to enable selected ones of said gates, modulating means connected to the output of said gates and operative to produce a frequency-modulated signal having a frequency determined by the magnitude of the output from said gates, and means for applying a triggering pulse to said counting means for each period of said frequency-modulated signal, whereby the output of said modulating means sequentially comprises an integral number of periods representing each of said channels.

6. Apparatus according to claim 5, wherein said counting means registers $A$ discrete digits in succession, and wherein each of said gates is enabled during registration of discrete groups of digits, the number of digits within each group being $A/N+1$ wherein $N$ is the number of channels.

* * * * *